US009092911B2

(12) United States Patent  
Harper et al.

(10) Patent No.: US 9,092,911 B2  
(45) Date of Patent: Jul. 28, 2015

(54) SUBPIXEL SHAPE SMOOTHING BASED ON PREDICTED SHAPE BACKGROUND INFORMATION

(71) Applicant: Apple Inc., Cupertino, CA (US)

(72) Inventors: John S. Harper, San Francisco, CA (US); Craig M. Federighi, Los Altos Hills, CA (US); Geoffrey Stahl, San Jose, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 13/791,222

(22) Filed: Mar. 8, 2013

(65) Prior Publication Data

US 2014/0253584 A1  Sep. 11, 2014

(51) Int. Cl.
*G06T 11/60* (2006.01)
(52) U.S. Cl.
CPC ..................... *G06T 11/60* (2013.01)

(58) Field of Classification Search
CPC ...................................................... G06T 11/60
See application file for complete search history.

(56) References Cited

U.S. PATENT DOCUMENTS

| 5,940,080 | A | 8/1999 | Ruehle et al. |
| 7,471,299 | B2 | 12/2008 | Rublee |
| 7,528,814 | B2 | 5/2009 | Sparre et al. |
| 2009/0289943 | A1 | 11/2009 | Teece |

*Primary Examiner* — Maurice L McDowell, Jr.
(74) *Attorney, Agent, or Firm* — Robert C. Kowert; Meyertons, Hood, Kivlin, Kowert & Goetzel, P.C.

(57) ABSTRACT

Methods and apparatus for a predictive rendering component that may generate a rendering of a character based at least in part on predictive information regarding the background into which the character is to be rendered. Using such predictive information, the predictive rendering component may produce a rendering of a character that blends into the character background more smoothly than if the predictive background information were not used. In this way, the predictive rendering component improves upon previous implementations of font smoothing.

20 Claims, 11 Drawing Sheets

*Access multiple predictions of background information for a character of a font type, where the character corresponds to a bitmap that has been generated from a mask, and where the mask is based on the font type* 602

*Generate multiple renderings of the character, where each rendering is based on a respective predicted background, based on a color of the character, and based on the mask* 604

*Remove, for each of the multiple renderings, one or more elements of the corresponding predicted background from the respective rendering of the character* 606

*Determine a match between a destination background and one of the predictions of backgrounds* 608

*Create a smoothed bitmap of the character, where the creation of the smoothed bitmap of the character includes compositing the destination background with the rendering of the character corresponding to the predicted background determined to match the destination background* 610

*FIG. 6*

SUBPIXEL SHAPE SMOOTHING BASED ON PREDICTED SHAPE BACKGROUND INFORMATION

BACKGROUND

Modern displays, such as a liquid crystal display (LCD), are capable of displaying rows and columns of pixels, where the pixels may be further composed of subpixels. A given pixel may be composed of different quantities of subpixels where each of the subpixels may correspond to a different color and where the subpixels may be arranged in a variety of configurations. Font smoothing is a technique for improving the smoothness and readability of text or characters rendered onto a display screen. There are a wide variety of techniques for font smoothing, however, these techniques tend to rely on rendering text onto a window represented as a single bitmap instead of a composite model of multiple layers of images. Further, these existing techniques fail to consider rendering text characters using information predicted for where the text characters will be rendered into prior to a final rendering of an image to be displayed.

SUMMARY

In one embodiment, a predictive rendering component may generate a rendering of a shape, such as a character, based on predictive information regarding the background into which the shape is to be rendered. For example, prior to a given character being rendered into a display, predicted background color may be accessed for the given character. For the given character there may be an existing bitmap corresponding to the character, where the bitmap is based on a particular font type and on a mask. Based on the predicated background color and based on a background color of the bitmap for the character, a composite of the backgrounds may be created. This composited background, along with a color of the character and the mask for the character may be used to generated a rendering of the character. Given the rendering of the character, one or more elements of the composited background created earlier may be removed from the generated rendering of the character. This removal of background elements results in a rendering of the character with elements of the background removed while fringes, or smoothing elements of the rendering, may remain. This rendering of the character may then be composited with a destination background in order to create a smoothed bitmap of the character that—because it makes use of the predicted background color—may blend more smoothly onto the display background when finally rendered for viewing.

BRIEF DESCRIPTION OF THE DRAWINGS

FIG. 6 depicts an example flowchart for selected operations of an embodiment of a predictive rendering component.

DETAILED DESCRIPTION OF EMBODIMENTS

Figure 1A:
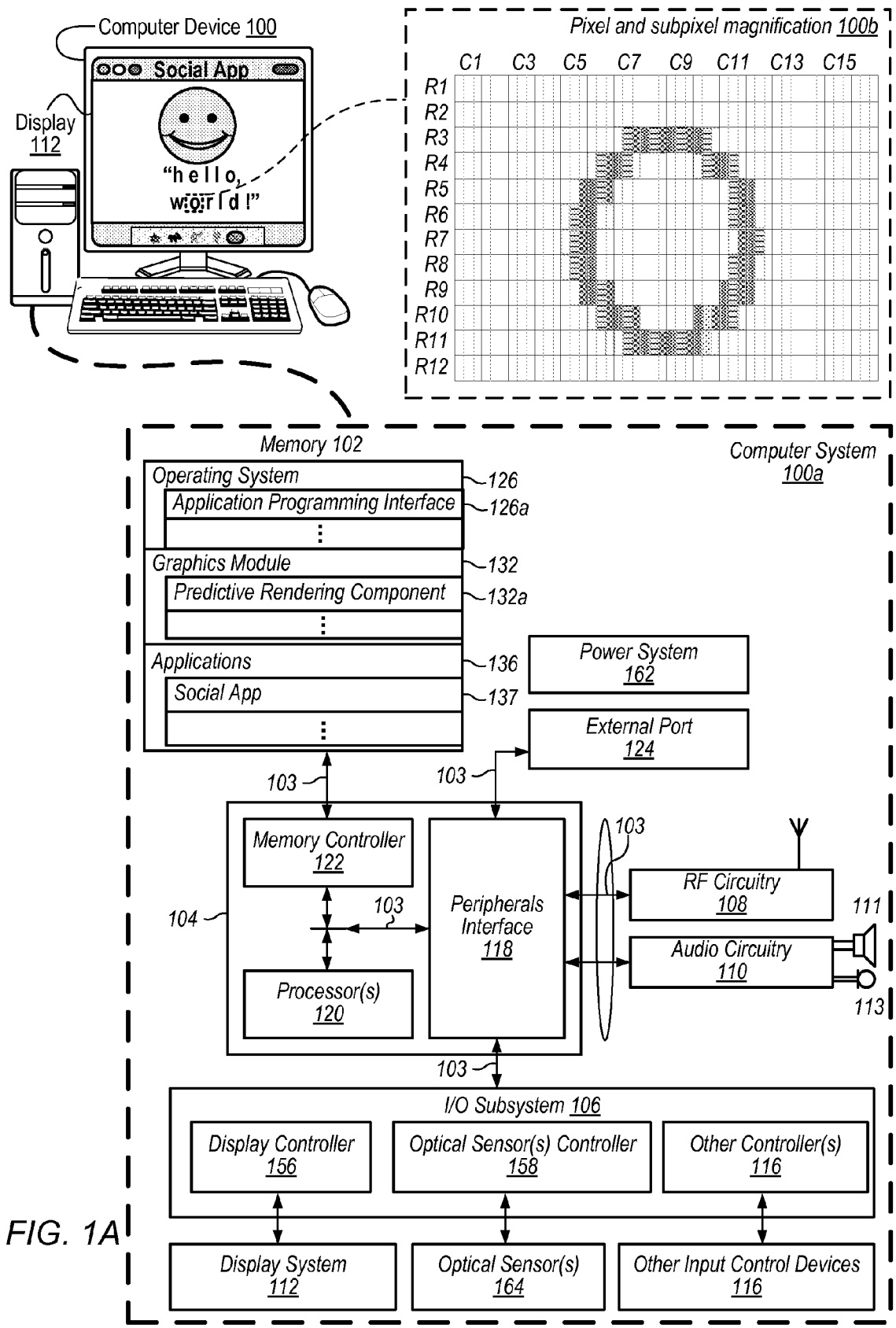
FIGS. 1A and 1B depict an illustration of a mobile device, including an example depiction of a magnification of a subpixel display and an example depiction of a computer system implementing a predictive rendering component, according to some embodiments.

Various embodiments are presented of a predictive rendering component designed to generate a rendering of a character based on predictive information regarding the background into which the character is to be ultimately rendered. In an environment in which portions or layers of a final image may be rendered prior to the final image to be display being rendered, previous implementations of font smoothing have been unable to render font smoothed characters because of a lack of availability of information on the final background upon which a character is to be rendered.

By contrast, using predicted information, the predictive rendering component may produce a rendering of a character that blends into the character background of a final rendering more smoothly than if the predictive background information were not used. Predicted information may include the color of the background for the area into which a character is to be rendered, and where the color of the background for the area is the color after the layers that compose the final rendered image of the area have been composited.

In general, the predictive rendering component may apply the predictive rendering embodiments discussed below to any shape or portion of a shape or image element, and not simply to characters of a font. In other words, any image element, shape or portion of a shape that is represented according to a bitmap may be processed with the various embodiments of a predictive rendering component.

In some embodiments, an application executing within an operating system may be responsible for rendering a logo for a sports team, where at least a portion of the background is some level of transparent, where the logo may include one or more lines, curves, or shapes, and where the logo may correspond to a logo bitmap. In such an example, the predictive rendering component operates as it would operate to process a font character.

In other embodiments, the predictive rendering component may be responsible for rendering a border or some other image element that is part of an overall application appearance. In such a case, the border or image element being rendered may benefit from smoothing the edges of the border or image element to provide a more polished look to the application, thereby increasing visual appreciation or satisfaction on the part of the user.

The predictive background information may be requested or accessed from the predictive rendering component through a variety of different methods. For example, text on a tablet computer may be animated to move across a screen over a variety of different backgrounds. Further, in this example, the tablet operating system may implement a graphics engine or component that may communicate to provide predictive information with various executable processes operating within the operating system, where one or more of the executable processes may have some role in the final image rendered on the tablet display.

Previous implementations of font smoothing rely on knowing the background of a font character at the time the font character is rendered, which prevents generation of a font smoothed character in advance of the font being finally rendered onto a display. However, modern operating systems and modern graphics rendering engines often generate a finally rendered image from a variety of different layers that are composited together, where different processes may be responsible for one or more of the variety of different layers. Within such an environment, it would be advantageous if the calculations for generating font smoothed characters could be performed in advance of the final rendering. This advantage is magnified in the context of animation within an application window where characters may be moving across a display.

However, without knowing what the background will be when a given character is finally rendered, it is not possible to generate a font smoothed character rendering with fringes of the character matching the final background. Fringes may be considered the pixels or subpixels that are at the edge of the character which are lit to display a variety of colors and intensities such that when the character is viewed by a user, the character edges appear smooth and the fringes match the color of the character and the background.

In some embodiments, to determine what the fringes should be for a given character, a mask may be used, where the mask may be a bitmap based on a glyph. A glyph, such as glyph 188 within FIG. 1B, may be considered a font shape for a character represented as a path or outline made up of one or more mathematical curves or lines. Using a mask for a given character, the pixels or subpixels wholly within the coverage of the mask may be colored according to the color for the given character and the pixels or subpixels only partially covered with the mask may be colored to create the fringes of the given character.

Further, given that a pixel is composed of multiple subpixels, there is a greater amount of information needed to determine which and how to light the subpixels in a given display. Therefore, for a given character, multiple masks may be defined, where each mask is centered on a given subpixel within a pixel. In this way, one bitmap may have multiple values per pixel, one value per subpixel, and each value may correspond to a particular mask. However, in the discussion of embodiments herein, for the sake of clarity, simply a "mask" is referred to, where the mask is representative of the various elements necessary for addressing the multiple subpixels within a single pixel.

As one example of a computing environment in which a predictive rendering component may be implemented, a tablet computer may have an application installed which may scroll text across an application window of the tablet display. Further, it may be that the graphics engine of the operating system is able to predict the background onto which a given character is to be ultimately rendered, or it may be that the app itself may communicate with the graphics engine of the operating system to provide the graphics engine with the background information. In this example, the ultimate rendering may be the final image rendered and viewable on the display, where the final image may be produced as a result of compositing multiple layers or multiple bitmaps. In either case, the predicted background information may be available prior to the given character being finally rendered within the window of the application on the table computer.

In some cases, the graphics engine, without any instruction from a given application, may identify or otherwise determine patterns, and use this identified or determined information as the basis on which to predict background information for given text or characters to be rendered within the application window. In this case, the graphics engine may store the predicted background information, and make the stored predictive information available to any process that calls into the graphics engine, for example, through an application programming interface.

In a simple case, for example, an application may call an interface routine requesting the predictive information, and in response, the graphics engine may provide the predictive information if any predictive information has been determined, or the graphics engine may provide a transparent layer, or a null value, or some other indication that no predictive information is available. In the case that a transparent layer is provided, no conditional check needs to be made on the predictive information by the requesting process because processing may proceed as if a non-transparent layer had been returned, and the result would be as if no predictive information had been provided.

In any case, so long as the predictive rendering component has access to predicted background information for a character to be rendered, the predictive rendering component may function to produce smoothly blended and smoothly rendered text based on the predictive background information.

As noted above, there may be more than one process within an operating system, including the operating system, that is responsible for the final image rendered on a display screen. As such, the final rendered image may be a composite of many different layers of images or bitmaps, where one or more of the processes are responsible for one or more of the layers of parts of layers.

For example, with regard to the above-discussed application executing on a tablet computer, the predictive rendering component may be responsible for generating a rendering of a character, and this generated rendering may be stored as a layer to be accessed and used for compositing with other layers at the time that the graphics engine of the tablet computer is generating a final rendering to be displayed within the application window.

Additional details and embodiments of a predictive rendering component are discussed below.

Detailed Description Considerations

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

As used herein, the terms "first", "second", and so on are used as labels for nouns that they precede, and do not imply any type of ordering (e.g., spatial, temporal, logical, etc.). For example, in a display environment having multiple display devices, the terms "first" and "second" display devices can be used to refer to any two of the multiple display devices. In other words, the "first" and "second" display devices are not limited to logical display devices 0 and 1.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to".

Example Computing Environment

Turning now toward embodiments of a predictive rendering component, FIG. 1A illustrates a computer device 100, which includes a LCD display screen 112 and computer system 100a, where the computer system 100a includes a memory 102 storing an implementation of a predictive rendering component 132a. In general, the predictive rendering component may be implemented on any computer system operating to provide images for rendering on a pixel-based or subpixel-based display.

In this example, the application "Social App", visible within LCD display 112, is currently executing and displaying the text, "hello, world!", and LCD magnification 100b illustrates an arrangement of pixels and subpixels that have been activated to produce a rendering of the second character "o".

Figure 1B:
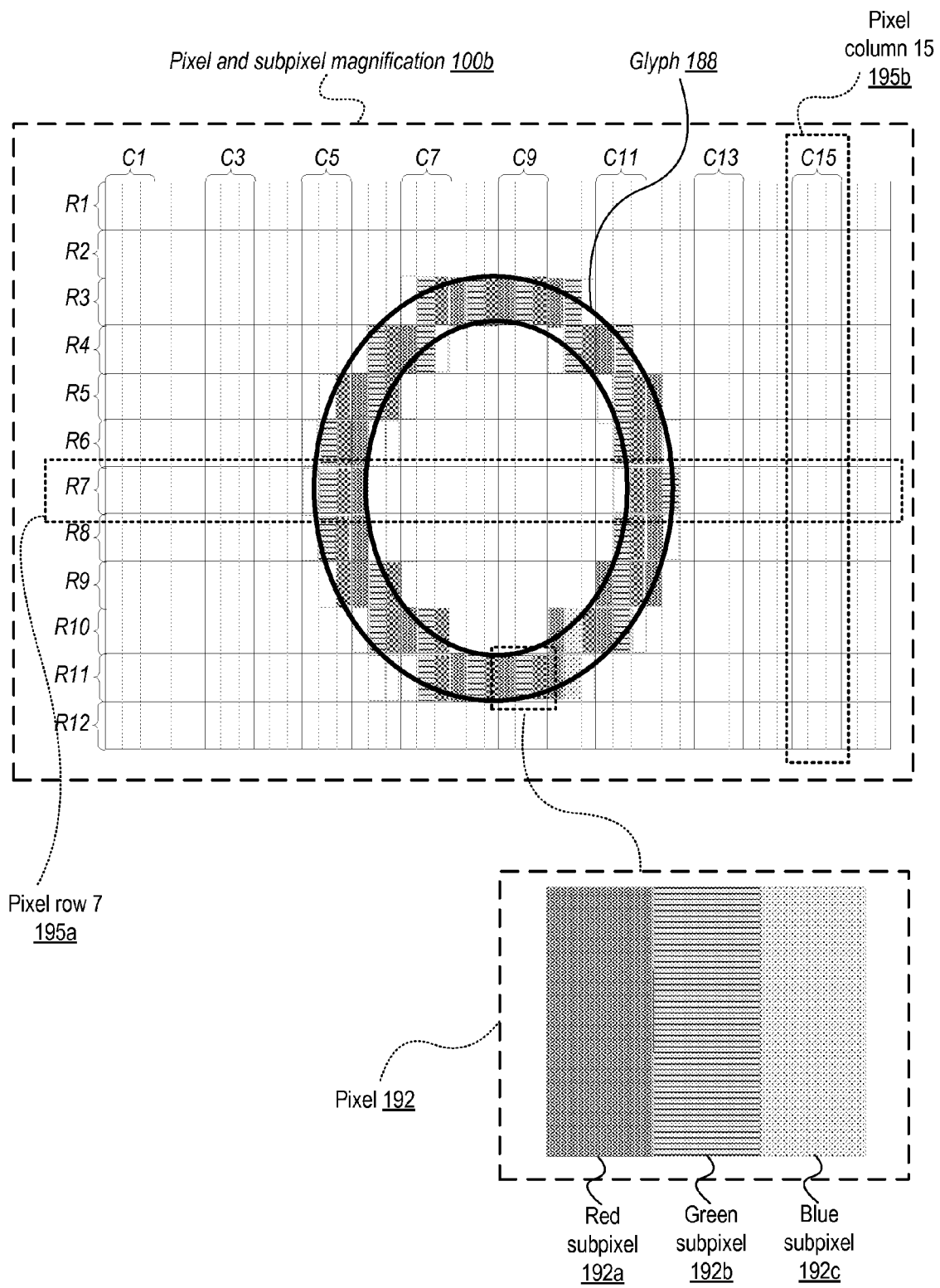

FIG. 1B provides a further breakdown of LCD magnification 100b, and includes a magnification of a particular pixel 192, where the particular pixel 192 is made up of three subpixels, red subpixel 192a, green subpixel 192b, and blue subpixel 192c. Each of the subpixels may display varying intensities of their respective color, and when viewed by a user, the combination of colors and intensities may represent thousands of different colors.

Within magnification area 100b are 16 columns of pixels and 12 rows of pixels, where an example of a column may be seen with pixel column 15 195b and pixel row 7 195a. Further within magnification area 100b is glyph 188, which is not part of the displayed rendering of the character and is shown overlaid onto the rendered subpixels for illustrative purposes.

Further, computer system 100a illustrates several hardware components included within device 100. In this example, the predictive rendering component 132a is embodied within graphics module 132, and where the graphics module 132 may communicate with operating system 126, and where each of these components and modules, among others, are stored within memory 102. In some cases, graphics module 132 or predictive rendering component 132a may communicate with the operating system 126 through application programming interface 126a. Memory 102 may be accessed from processor or processors 120 and memory controller 122 on chip 104.

As mentioned above, the predictive rendering component may be accessed or called from an application, such as Social App 137 or operating system 126 in the service of producing a final rendered image on display screen 112. Further, the assignment of responsibilities for generating a final rendered image may be distributed in different ways among the graphics module 132, operating system 126, and Social App 137, among potentially others.

In this example, each pixel within the LCD screen is composed of three subpixels, a red, a green, and a blue subpixel, arranged horizontally adjacent to each other and in the order of red-green-blue. However, in general, the predictive rendering component may be modified to operate with any number of subpixel colors and any arrangement of subpixels, and the below discussion of red-green-blue subpixels is simply one possible embodiment.

Device 100 may include memory 102 (which may include one or more computer-readable storage mediums, including non-transitory computer-readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a computer device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves.

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116.

Device 100 also includes power system 162 for powering the various components, and may also include one or more optical sensors 164. FIG. 1 shows an optical sensor coupled to optical sensor controller 158 in I/O subsystem 106. Optical sensor 164 may include charge-coupled device (CCD) or complementary metal-oxide semiconductor (CMOS) phototransistors.

In some embodiments, the software components stored in memory 102 include operating system 126, communication module (or set of instructions), contact/motion module (or set of instructions), graphics module (or set of instructions) 132, text input module (or set of instructions), Global Positioning System (GPS) module (or set of instructions), applications (or sets of instructions) 136, including Social App 137.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

A text input module 134 may be a component of graphics module 132, provides soft keyboards for entering text in various applications (e.g., Social App 137, e-mail 140, IM 141, browser 147, and any other application that needs text input).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above Predictive Rendering Component As discussed above in regard to FIG. 1A, an application, such as Social App 137 may operate to communicate with a predictive rendering component 132a implemented as part of a graphics module 132 in order to generate a rendering of characters to display within the Social App user interface rendered within display 112. A given rendering of a character may be represented as a bitmap.

As one of the features of the Social App, the Social App may scroll or simply display text across display 112 and within the user interface of Social App. Further, as discussed above, Social App may be one of multiple processes responsible for the ultimate rendered image displayed on the screen. In this case, part of the responsibilities of Social App may be communicating with a graphics module to render given characters as a bitmap, and where the bitmap is used within the graphics module 132 to be composited or integrated, along with various other bitmaps or layers, into the final rendering displayed on the screen.

For example, the Social App may communicate information to the graphics module that includes a specification on the area of a display where the character is to be rendered in addition to characteristics of a character such as font type, size, formatting, color, among others. The graphics module may use this received information as a basis for determining an appropriate mask to be used for rendering the character.

Overall, in this example, the predictive rendering component, to generate a bitmap rendering or layer that is to be part of other bitmaps or layers, may adjust a background for a current character bitmap based on predicted background information, generate a rendering onto the adjusted background, remove the adjusted background from the rendering of the character. In some embodiments, the rendered character with the removed portions of the background may then be composited with the original bitmap of the character to create an updated version of the bitmap for the character—the updated version of the bitmap for the character may then be used for compositing with other bitmaps or layers to generate a final rendering to be displayed on a display screen.

In other embodiments, the rendered character with the removed portions of the background may be used directly in compositing with other bitmaps or layers to generate a final rendering to be displayed on a display screen with which the process began. In this way, the updated bitmap for the character is ready to be composited with other bitmaps to generated a final rendering of an image to be displayed on a screen.

In other words, once the background is removed, and the bitmap simply includes the character rendering on a transparent background, instead of the bitmap being composited with the original bitmap, the bitmap may be used to be composited with the other bitmaps in composing the final rendering of an image to be displayed on a screen.

Figure 2A:
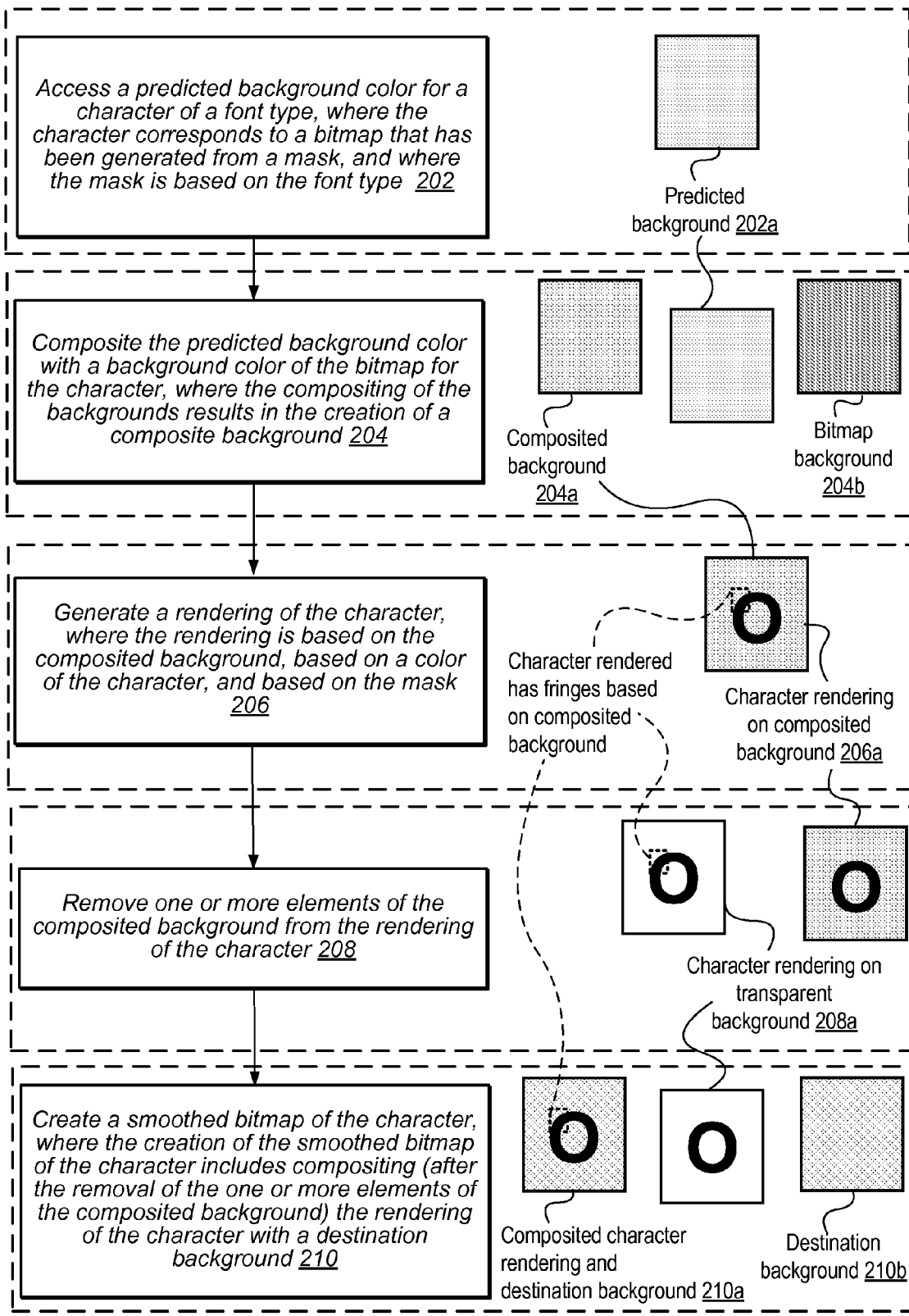
FIGS. 2A and 2B depict example flowcharts for selected operations of embodiments of a predictive rendering component and example depictions of illustrations corresponding operations within the flowchart.

The predictive rendering component, to generate a bitmap or layer that may be part of other layers or bitmaps, may access a predicted background color for a given character to be rendered, as depicted within stage 202 of FIG. 2A. As discussed above, the bitmap for the character may be based on a mask for the character, where the mask is based on a particular font type. In other words, different font type characters may correspond to different glyphs and to different masks.

The access or attempted access to predicted background information may take various forms. For example, the predictive rendering component may read or access memory storing previously received predictive background information. In other example, the predictive rendering component may request predictive background information from the graphics module, an application for which a character is to be rendered, or the operating system—depending on the organization and division of responsibilities for rendering an image on the display.

In this example, predicted background 202a depicts the predicted background color accessed, retrieved, or requested from the predictive rendering component. In general, instead of simply accessing a predicted color, the predictive rendering component may access predicted background information that may be values representing colors for one or more colors, or the predicted background may be a layer which may include colors or patterns or other visual information. In some cases, the predicted background information may be a layer that includes one or more portions of images. Further, the predicted background information may include information on a level of transparency of the predicted background.

Given the predicted background information 202a, the predictive rendering component may then generate a composited background to be used later for rendering a character onto, as reflected at stage 204. In this example, the predictive rendering component may composite the predicted background color with a background color of the current bitmap for the character, and a result of the compositing operation is a composited background 204a. In this example, the background color of the current bitmap is depicted in FIG. 2A as bitmap background 204b.

If, for example, the current background color of the bitmap for the character is transparent, then the composited background may simply be the predicted background color. If, for example, the current background color of the bitmap for the character is non-transparent, then the composite may be a blend of the colors of the predicted background and the current bitmap background. In other words, if the current bitmap background is white (#FFFFFF) and the predicted color is gray (#808080), then the composited color may be silver (#C0C0C0).

In different embodiments, the composite operation may use weighted values for emphasizing either the current bitmap background or the predicted bitmap background. For example, if the compositing operation were provided a weight for the current bitmap of 0.75 on a scale of zero (0) to one (1), then the composited color would be closer to the current background color than the predicted color. In other words, if the current bitmap background is white (#FFFFFF) and the predicted color is gray (#808080) and the weight for the current bitmap background is 0.75, then the composited color may be a color between silver (#C0C0C0) and white (#FFFFFF), such as a light silver (#E0E0E0). Similarly, a weight value for the current bitmap character of 0.25 would place a greater emphasis on the predicted background color. In general, the weight scale may be any range where different points along the range correspond to different amounts of emphasis for either the predicted background or the current bitmap background.

Given the composited background 204a, the predictive rendering component may then render the character onto the composited background, as reflected at stage 206. As discussed above, an effect of generating a rendering of the character onto the composited background is the generation of fringes for the character that result in a font smoothed character when the character is finally rendered onto the display screen. In this example, the generated rendering may be based on a mix or linear mix of (a) the composited background, (b) a blend of the character color and composited background, and (c) the mask for the character. In other embodiments, simply the color of the character may be used instead of a blend of the color of the character and the composited background. In this example, the generated rendering of the character onto the composited background is depicted as character rendering 206a.

Given the rendering of the character onto the composited background, the predictive rendering component may then prepare the rendering of the character to be composited with the original character bitmap or other bitmaps or layers in order to generate a final image to be displayed on the screen. To this end, the predictive rendering component may remove one or more elements of the background from the rendering of the character onto the composited background, as reflected at stage 208.

As a result of removing portions of the background, and because the elements removed are based on the composited background that the character was rendered onto, the rendering of the character may have a transparent background, as depicted with the character on a transparent background 208a.

Once the character has a transparent background, and where the character has fringes based on the background composited from the predicted background and the current bitmap background, then the character on the transparent background 208a may be composited with other bitmaps or layers.

In this example, the predictive rendering component may create a composite of the character with the transparent background 208a with a given destination background 210b to create a composite 210a, as reflected at stage 210. The destination background is depicted as destination background 210b. As noted above, the destination background may be from the current or original character bitmap or the destination background may be any other bitmap or layer that is also going to be part of the final rendering generated to be displayed on the screen.

As discussed above in regard to stage 208, the predictive rendering component, after rendering a character onto a composited background, may remove elements of the resulting rendering in order to produce a rendering of the character with a transparent background. The removal of elements of the background from the rendered character—while maintaining enough of the fringe on the character in order for the character to appear smooth to a user—may be performed in a variety of different ways.

In one embodiment, a background removal factor may be calculated based on the red, green, and blue values of the mask for a given character. If the predictive rendering component were to simply remove the composited background 204a from the rendered character 206a, then the result may be a rendered character on a transparent background 208a with too much of the character fringes removed, which may have the effect of appearing less smooth. However, if not enough of the composited background 204a is removed from rendered character 206a, then the result may be a rendered character on a transparent background 208a with too much of the character fringes remaining in place, which may have the effect of appearing too fuzzy or with so much fringe that the character edges are blurry and not smooth.

For example, given a mask, M, for the character, the maximum of the red, green, and blue values may be determined to generate, say x, a background removal factor. In a pseudo-code representation of this operation, "x=maximum(M.r, M.g, M.b)". Given background removal factor x, and given the rendering of the character onto the composited background (such as character rendering 206a), say R, the removal operation may be represented as, "R=R−D*(1−x)", where D represents the composited background, and where the red, green, and blue values may range from zero (0) to one (1), where the result of this range provides a multiplicative scaling factor to D in the range of zero (0) to one (1).

In other embodiments, instead of using the maximum values for the mask for the character, the predictive rendering component may base the background removal factor on other formulations of the mask values. For example, instead of taking a maximum, the predictive rendering component may base the background removal factor on average values for the red, green, and blue values of the mask. In other words, In a pseudo-code representation of this operation, "x=average (M.r, M.g, M.b)". Given background removal factor x, and given the rendering of the character onto the composited background R, the removal operation may again be represented as, "R=R−D*(1−x)", where D represents the composited background.

In general, the amount of fringe left on the rendered character 206a may be determined based on a removal factor that is based on a function that accepts as a parameter a magnitude of the amount of fringe desired. For example, in pseudo-code, "x=fringe_factor(M, fringe_value)", where fringe_value may be a constant value from, say one to ten, or some other spectrum of values where points on the spectrum correspond to an amount of fringe to be allowed to remain as represented as removal factor x. The calculated removal factor x may then be removed from the rendered character R, as above, "R=R−D*(1−x)".

Further, the removal operation may be condensed to a single logical operation. For example, instead of "x=fringe_factor(M, fringe_value)" and "R=R−D*(1−x)", the removal operation may be represented as, "R=fringe_masking(M, R, fringe_value)", where the fringe_masking( ) function uses the character mask M and fringe_value to determine how much fringe to preserve on the rendered character R. The fringe_value may in turn be based on a user setting provided by a user through a preferences user interface for specifying a font smoothness factor. The fringe_value, as above, may be a spectrum of values.

Additional Embodiment of a Predictive Rendering Component

As discussed above in regard to FIG. 2A, an application, such as Social App 137 may operate to communicate with a predictive rendering component 132a implemented as part of a graphics module 132. However, the predictive rendering component 132a is not restricted to rendering font characters, and may generally create a rendering of any shape or portion of a shape or image element to display. If the shape, portions of a shape, or image element has a corresponding mask and bitmap, then the predictive rendering component may operate to produce a smoothed edge for the shape, portion of the shape, or image element.

Figure 2B:
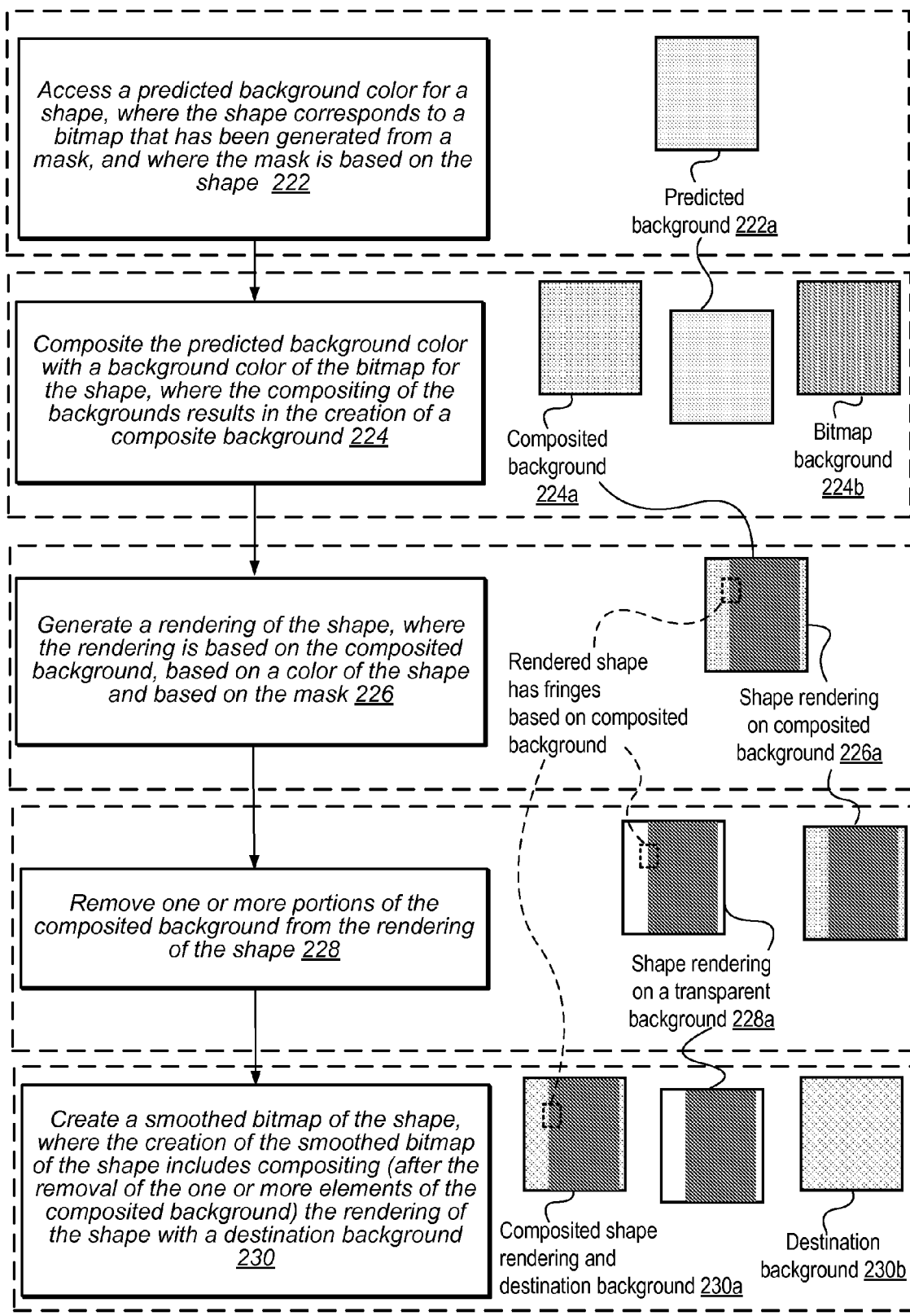

Similar to the flowchart for the embodiment of the predictive rendering component described above in regard to FIG. 2A, the flowchart of FIG. 2B depicts selected operations to illustrate the more general rendering of an image element or shape.

The predictive rendering component, to generate a bitmap or layer that may be part of other layers or bitmaps, may access a predicted background color for a given shape to be rendered, as depicted within stage 222 of FIG. 2B. As discussed above, the bitmap for the character may be based on a mask for the shape, where the mask may be based on a particular glyph or vector-based description of the shape.

In this example, predicted background 222a depicts the predicted background color accessed, retrieved, or requested from the predictive rendering component. Given the predicted background information 222a, the predictive rendering component may then generate a composited background to be used later for rendering a character onto, as reflected at stage 224. In this example, the predictive rendering component may composite the predicted background color with a background color of the current bitmap for the shape, and a result of the compositing operation is a composited background 224a. In this example, the background color of the current bitmap is depicted in FIG. 2B as bitmap background 224b.

Given the composited background 224a, the predictive rendering component may then render the shape onto the composited background, as reflected at stage 226. As discussed above, an effect of generating a rendering of the shape onto the composited background is the generation of fringes for the shape that result in a smoothed appearance when the shape is finally rendered onto the display screen. In this example, the generated rendering may be based on a mix of linear mix of (a) the composited background, (b) a blend of the shape color and composited background, and (c) the mask for the shape. In other embodiments, simply the color of the shape may be used instead of a blend of the color of the shape and the composited background. In this example, the generated rendering of the shape onto the composited background is depicted as shape rendering 226a.

Given the rendering of the shape onto the composited background, the predictive rendering component may then prepare the rendering of the shape to be composited with the original shape bitmap or other bitmaps or layers in order to generate a final image to be displayed on the screen. To this end, the predictive rendering component may remove one or more portions of the background from the rendering of the shape onto the composited background, as reflected at stage 228.

As a result of removing portions of the background, and because the portions removed are based on the composited background that the shape was rendered onto, the rendering of the shape may have a transparent background, as depicted with the shape on a transparent background 228a.

Once the shape has a transparent background, and where the shape has fringes based on the background composited from the predicted background and the current bitmap background, then the shape on the transparent background 228a may be composited with other bitmaps or layers.

In this example, the predictive rendering component may create a composite of the character with the transparent background 228a with a given destination background 230b to create a composite 230a, as reflected at stage 230. The destination background is depicted as destination background 230b. As noted above, the destination background may be from the current or original bitmap for the shape or the destination background may be any other bitmap or layer that is going to be part of the final rendering generated to be displayed on the screen.

Predictive Rendering Component within a Larger Processing Flow

Figure 3:
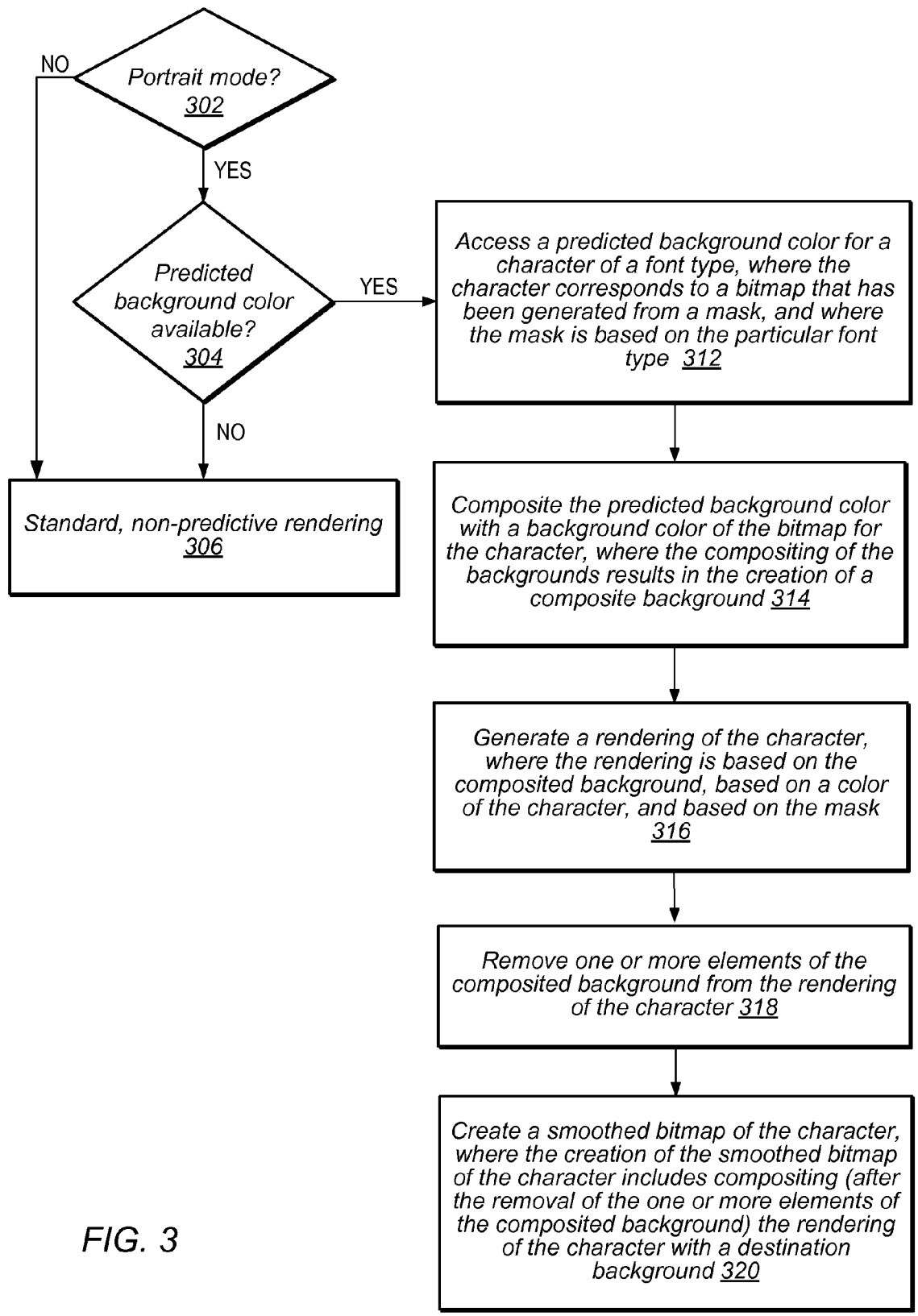
FIG. 3 depicts an example flowchart depicting conditions under which to invoke the predictive rendering component, according to some embodiments.

FIG. 3 illustrates selected operations of an embodiment of a predictive rendering component on a device capable of shifting between the display of contents on a screen in a portrait mode or a landscape mode. In this embodiment, if the device is not in portrait mode, as determined at stage 302, then the predictive rendering component is not engaged and, instead, a standard, non-predictive rendering is used for rendering characters, as reflected at stage 306.

However, if the device is in portrait mode, then control may pass to stage 304, where a determination is made regarding whether predicted background information is available. Whether the predicted background information is available may depend on whether the information has been previously stored, for example, within a data field of the mask for the character, or on whether a request for the predicted background information returns with the predicted background information or a null value or some other indication of non-availability of the predicted background information.

If predicted background color information is available, then control passes to stage 312, where stage 312 corresponds to stage 202 of FIG. 2A. In other words, if predicted background color is available, then the predictive rendering component proceeds as described in regard to FIG. 2A and stages 202-210. Stages 314-320 of FIG. 3 correspond to stages 204-210 of FIG. 2A. Further, in other embodiments, if the predicted background color is available, then the predictive rendering component may operate as discussed herein with any other embodiment of the predictive rendering component.

Alternative Predictive Rendering Component

Figure 4A:
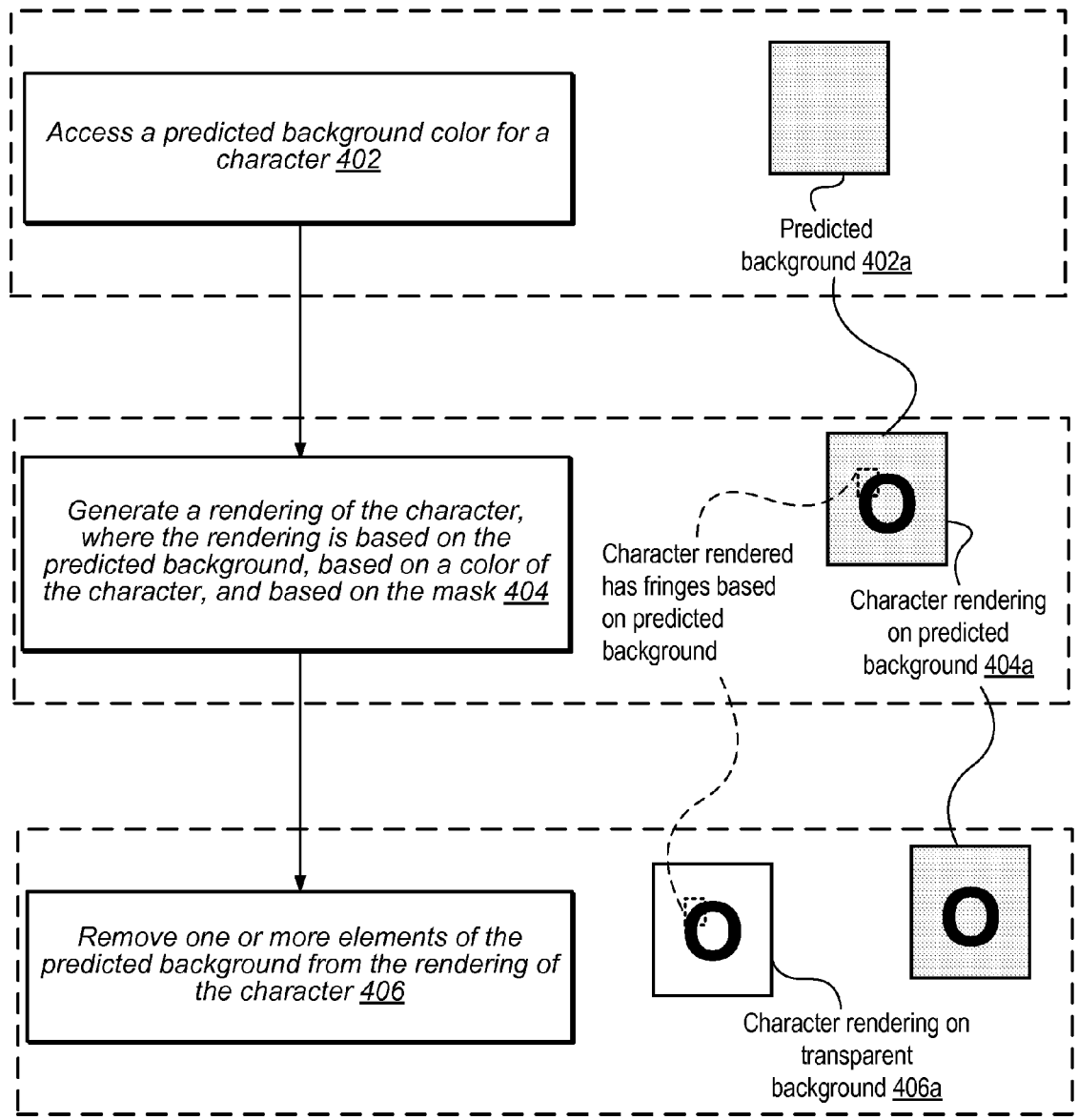
FIGS. 4A and 4B depict example flowcharts for selected operations of embodiments of a predictive rendering component and example depictions of illustrations corresponding operations within the flowchart.

FIG. 4A illustrates a flowchart of selected operations for an embodiment of a predictive rendering component similar to the embodiment described above in regard to FIG. 2A, but with fewer operations. However, as is the case with the embodiment described in regard to FIG. 2A, this embodiment of a predictive rendering component generates a character rendering based on predicted background information.

Further, similar to the generalization of the predictive rendering component discussed above in regard to FIG. 2B, the flowchart and embodiments described in regard to FIG. 4A may be similarly applied to operate on any shape or image element instead of simply a font character, as described below in regard to FIG. 4B.

In this embodiment, the predictive rendering component, given a particular character to render, may determine whether predicted background information is available. To determine whether predicted background information is available, the predictive rendering component, may attempt to access or read or request predicted background information corresponding to the character to be rendered, as reflected at stage 402, and where the predicted background information determines predicted background 402a. In some cases, the predictive rendering component may access or request the predicted background from a graphics module.

Further, the predicted background information may be determined based on the coordinates within the display where the character is to be rendered. For example, if the predictive rendering component is to render the character within a range of rows and columns of pixels or subpixels, then the predictive rendering component may specify—within a request for background information for the character—the region of the display according to the pixels or subpixels for the graphics module to determine the appropriate background information to return.

Given the predicted background information corresponding to the character to be rendered, the predictive rendering component may render the character onto the predicted background 402a to generate a character rendering 404a, as reflected at stage 404. The rendering of the character may be based on a mix or linear mix of (a) the predicted background 402a, (b) the color of the character, and (c) the mask for the character. The rendering of the character is similar to the rendering of the character discussed above in regard to FIG. 2A.

In some cases, the rendering of the character may be based on a mix or linear mix of (a) the predicted background 402a, (b) a blend of the color of the character with the predicted background 402a, and (c) the mask for the character. In other embodiments, the rendering of the character onto a given background may be performed in a variety of different ways currently existing in the art.

In either case, the character that is rendered may have fringes that are colored such that the fringes match the predicted background and such that when the character that is rendered appears smoothly to the viewer when the character that is rendered is finally composited to create a final image rendering to be displayed on the screen.

In cases where the predicted background differs from the ultimate, actual background onto which the character is rendered, the fringes may appear to not match on a degree corresponding to the degree of difference between the predicted background and the ultimate, actual background. In other words, if the prediction is close, then the fringes may still appear to provide a good font smoothing effect, whereas if the prediction is not close, the fringes may appear to be mismatching.

In order to prepare the character rendering 406a to be composited with other layers or bitmaps in order to generate an ultimate rendering for display on a screen, as discussed above in regard to FIG. 2A, the predictive rendering component may remove portions of the background of the character rendering 404a, as reflected at stage 406 Where the portions of the background are removed from character rendering 404a, the background of character rendering 406a may be transparent.

Further, to remove the portions of the background of character rendering 404a, the predictive rendering component may use the predicted background information. As discussed above in regard to FIG. 2A, the predictive rendering component may perform the removal of background portions of the character rendering 404a using the various methods discussed. For example, the predictive rendering component may determine, in various ways, a background removal factor x and use this to remove the portions of the background of the rendered character 404a. In other cases, the predictive rendering component may use the discussed fringe_masking( ) function for generating a new version of the character rendering 404a.

In this way, the predictive rendering component may generate a rendered character on a transparent background, where the rendered character has fringes based on the predicted background information and where the rendered character is ready for being composited with other bitmaps or layers for generating an image for display on a screen.

In some embodiments, character rendering 406a may be composited with an original bitmap for the character and the result may be used to replace the original bitmap character. In this way, when the character is finally composited with other layers to generate the final image on the display, the bitmap used is the updated original bitmap.

Alternative Predictive Rendering Component

Figure 4B:
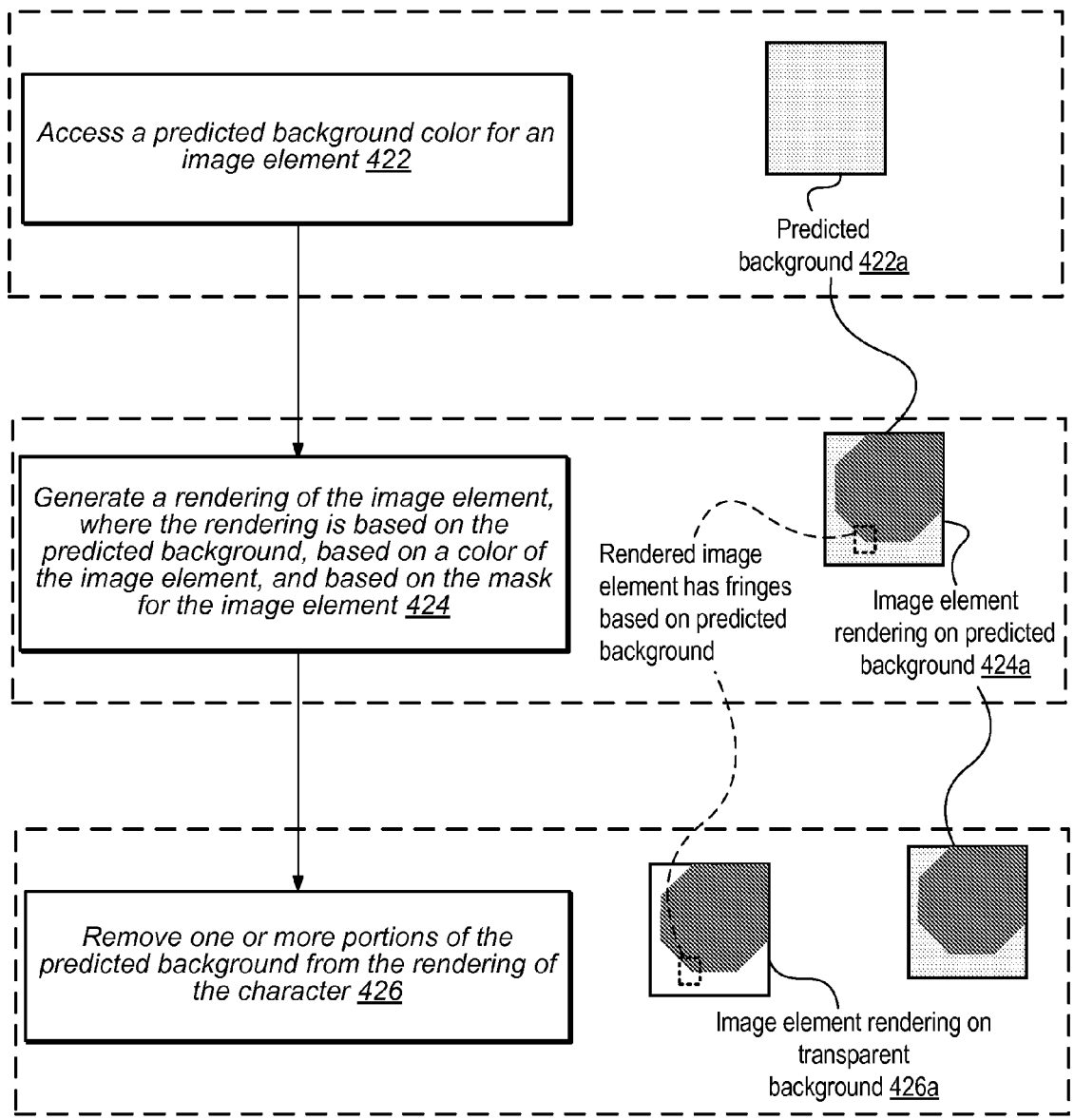

FIG. 4B illustrates a flowchart of selected operations for an embodiment of a predictive rendering component similar to the embodiment described above in regard to FIG. 2B, but with fewer operations. However, as is the case with the embodiment described in regard to FIG. 2B, this embodiment of a predictive rendering component generates a shape or image element rendering based on predicted background information.

In this embodiment, the predictive rendering component, given an image element to render, may determine whether predicted background information is available. To determine whether predicted background information is available, the predictive rendering component may attempt to access or read or request predicted background information corresponding to the image element to be rendered, as reflected at stage 422, and where the predicted background information determines predicted background 422a.

Given the predicted background information corresponding to the character to be rendered, the predictive rendering component may render the character onto the predicted background 422a to generate an image element rendering 424a, as reflected at stage 424. The rendering of the image element may be based on a mix or linear mix of (a) the predicted background 422a, (b) the color of the image element, and (c) the mask for the image element. The rendering of the image element is similar to the rendering of the font character described above in regard to FIG. 2A.

In some cases, the rendering of the image element may be based on a mix or linear mix of (a) the predicted background 422a, (b) a blend of the color of the image element with the predicted background 422a, and (c) the mask for the image element. In other embodiments, the rendering of the image element onto a given background may be performed in a variety of different ways currently existing in the art.

In either case, the image element that is rendered may have fringes that are colored such that the fringes match the predicted background and such that when the image element that is rendered appears smoothly to the viewer when the image element that is rendered is finally composited to create a final image rendering to be displayed on the screen.

In order to prepare the image element rendering 426a to be composited with other layers or bitmaps in order to generate an ultimate rendering for display on a screen, as discussed above in regard to FIG. 2A, the predictive rendering component may remove portions of the background of the image element rendering 424a, as reflected at stage 426 Where the portions of the background are removed from character rendering 424a, the background of character rendering 426a may be transparent. The portions of the background may be removed as discussed above in regard to FIG. 2A.

In this way, the predictive rendering component may generate a rendered image element on a transparent background, where the rendered image element has fringes based on the predicted background information and where the rendered image element is ready for being composited with other bitmaps or layers for generating an image for display on a screen.

In some embodiments, image element rendering 426a may be composited with an original bitmap for the image element and the result may be used to replace the original bitmap for the image element. In this way, when the image element is finally composited with other layers to generate the final image on the display, the bitmap used is the updated original bitmap.

Alternative Predictive Rendering Component

Figure 5:
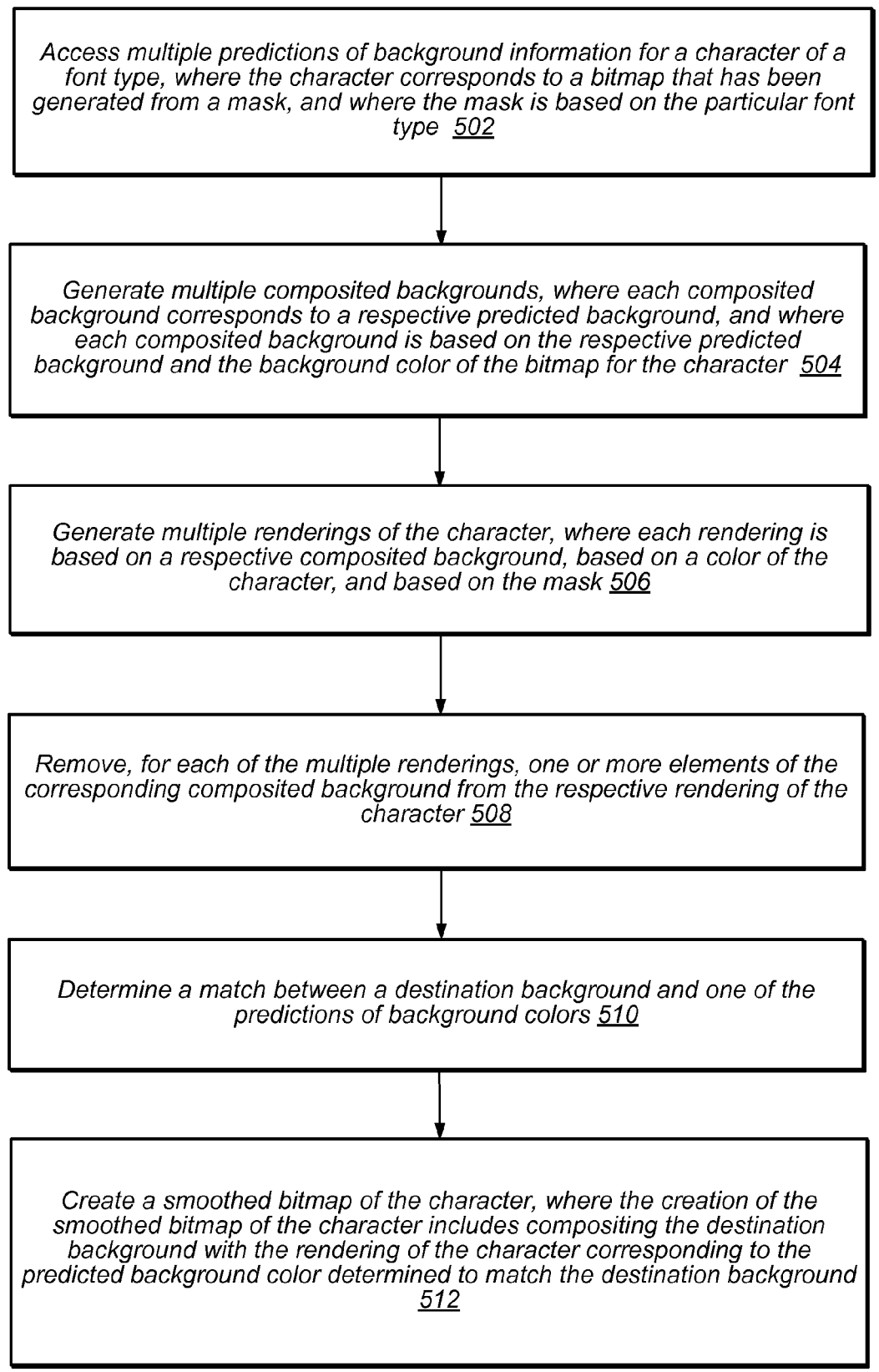
FIG. 5 depicts an example flowchart for selected operations of an embodiment of a predictive rendering component.

FIG. 5 illustrates a flowchart of selected operations for an embodiment of a predictive rendering component similar to the embodiment described above in regard to FIG. 2A. However, in this embodiment the predictive rendering component generates multiple renderings based on multiple predicted backgrounds, and where at the time the rendered character is to be composited to generate a final rendering of an image to be displayed, the predictive rendering component, or some other process, may select one of the multiple previously rendered characters based on which of the previously rendered characters has been rendered on a background that matches what turns out to be the actual destination background.

In other words, as discussed above, a single prediction may turn out to be inaccurate, and sometimes the graphics module or operating system may determine that the predicted background may be either one color or another color, perhaps depending on some variable that is to be determined at a later point in time, such as a user selection, an update from some third party, or from some other source. In some cases, there may be more than two possible background results for when the character is to be composited with a destination background.

As with the embodiment described above in regard to FIG. 2A, the predictive rendering component may access a prediction for background information onto which a character is to be rendered. However, in this case, the predictive rendering component may request or attempt to access background information corresponding to multiple predicted backgrounds, as reflected in stage 502. In some cases, the predictive rendering component may request or access the background information from the graphics module or from some other process.

Further, similar to the generalization of the predictive rendering component discussed above in regard to FIGS. 2B and 4B, the flowchart and embodiments described in regard to FIG. 5 may be similarly applied to operate on any image element instead of simply a font character.

If there is only a single predicted background, processing would continue as described above in regard to FIG. 2A.

Otherwise, the predictive rendering component may then, similar to stage 204, generate a composited background for each of the predicted backgrounds, as reflected in stage 504. As in stage 204, each of the composited backgrounds may be based on a respective predicted background and the background color of the current bitmap for the character to be rendered.

Given the multiple composited backgrounds, the predictive rendering component may generate multiple renderings of the character—a rendering of the character for each of the multiple composited backgrounds, as reflected at stage 506. Each of these multiple renderings of the character, as in stage 206 of FIG. 2A, may be based on (a) a respective composited background, (b) a color of the character, or a blend of the color of the character and the respective composited background, and (c) the mask for the character.

Given the multiple renderings of the character, the predictive rendering component may remove portions of the background from each of the multiple renderings of the character, as reflected at stage 508. For each particular removal of a background for a given rendering of the character, the predictive rendering component may base the removal on a corresponding composited background. The removal operation may be any of the above discussed removal operations.

At this point, each of the renderings of the character has had portions of the background removed, and each of the renderings of the character would blend to form a smoothed rendering of the character for a background that matches the background on which the respective rendering of the character was based.

When the time comes that the character rendering is to be composited to form the ultimate rendering of an image displayed on a screen, the predictive rendering component may have access to the background onto which the character is to be rendered. In this way, at this point, the predictive rendering component may determine which of the multiple predicted background colors that have been used to generate the multiple renderings is a closest match to the colors of the destination background color, as reflected at stage 510. In some cases, a color distance may be determined and the color distance may serve as the basis for determining the match.

Once the predictive rendering component has determined a match between one of the predicted background colors and the destination background, the predictive rendering component may create a smoothed bitmap of the character, where creating the smoothed bitmap may include compositing the destination background with the rendering of the character corresponding to the predicted background color determined to match the destination background, as reflected at stage 512.

Alternative Predictive Rendering Component

FIG. 6 illustrates a flowchart of selected operations for an embodiment of a predictive rendering component similar to the embodiment described above in regard to FIGS. 4A and 4B. However, in this embodiment the predictive rendering component generates multiple renderings based on multiple predicted backgrounds, and where at the time the rendered character is to be composited to generate a final rendering of an image to be displayed, the predictive rendering component may select one of the multiple previously rendered characters based on which of the previously rendered characters has been rendered on a background that matches what turns out to be the actual destination background.

In other words, as discussed above, a single prediction may turn out to be inaccurate, and sometimes the graphics module or operating system may determine that the predicted background may be either one color or another color, perhaps depending on some variable that is to be determined at a later point in time, such as a user selection, an update from some third party, or an update from some other source or process. In some cases, there may be more than two possible background results for when the character is to be composited with a destination background.

As with the embodiment described above in regard to FIG. 4A, the predictive rendering component may access a prediction for background information onto which a character is to be rendered. However, in this case, the predictive rendering component may request or attempt to access background information corresponding to multiple predicted backgrounds, as reflected in stage 602. In some cases, the predictive rendering component may request or access the background information from the graphics module or from some other process.

Further, similar to the generalization of the predictive rendering component discussed above in regard to FIGS. 2B and 4B, the flowchart and embodiments described in regard to FIG. 6 may be similarly applied to operate on any image element instead of simply a font character.

If there is only a single predicted background, processing would continue as described above in regard to FIG. 4A.

Otherwise, the predictive rendering component may then, similar to stage 404, generate a rendering of the character, and in this case, there is a generated rendering of the character for each of the predicted backgrounds, as reflected in stage 604. Each of these multiple renderings of the character may be based on (a) a respective predicted background, (b) a color of the character or a blend of a color of the character and the respective predicted background, and (c) the mask for the character. Each of these renderings may be generated independently, and therefore in parallel, for example on the multiple processors 120 of FIG. 1A, and this applies similarly to FIG. 5.

Given the multiple renderings of the character, the predictive rendering component may proceed to remove portions of the background of each of the multiple renderings, as reflected in stage 606. For each removal of a background for a given rendering of the character, the predictive rendering component may base the removal on a corresponding predicted background. The removal operation may be any of the above discussed removal operations.

At this point, each of the renderings of the character has had portions of the background removed, and each of the renderings of the character would blend to form a smoothed rendering of the character for a background that matches the background on which the respective rendering of the character was based.

When the time comes that the character rendering is to be composited to form the ultimate rendering of an image displayed on a screen, the predictive rendering component may have access to the background onto which the character is to be rendered. In this way, at this point, the predictive rendering component may determine which of the multiple predicted background colors that have been used to generate the multiple renderings is a closest match to the colors of the destination background color, as reflected at stage 608.

Each of these matching determinations may be calculated independently, and therefore in parallel, for example on the multiple processors 120 of FIG. 1A, and this applies similarly to FIG. 5. Further, each matching determination may be based on, for example a color distance measure, and the various calculated color distance measures between each predicted background and the actual destination background may serve as the basis for determining the matching predicted background.

Once the predictive rendering component has determined a match between one of the predicted background colors and the destination background, the predictive rendering component may create a smoothed bitmap of the character, where creating the smoothed bitmap may include compositing the destination background with the rendering of the character corresponding to the predicted background color determined to match the destination background, as reflected at stage 610.

Predictive Rendering Component Module

Figure 7:
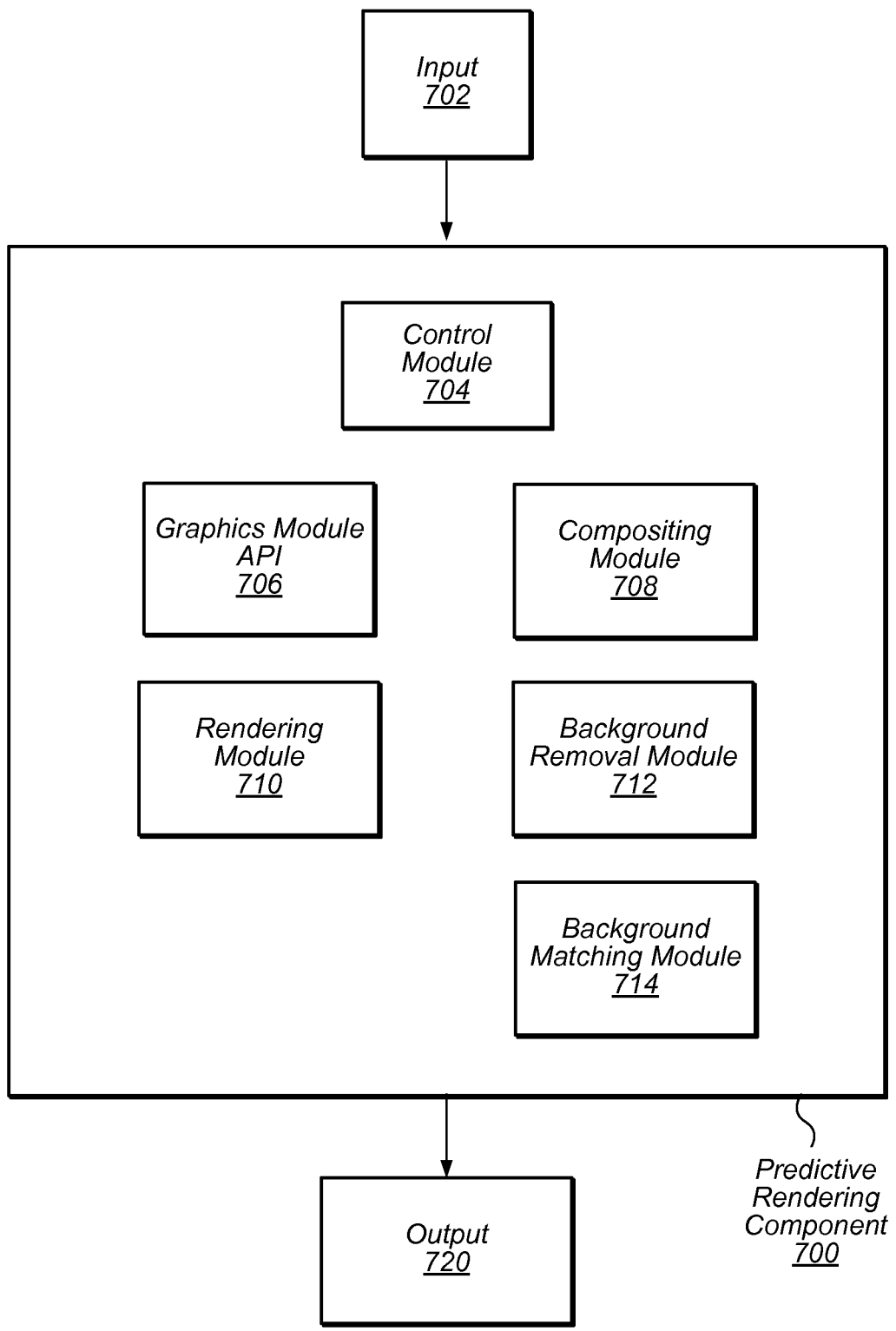
FIG. 7 illustrates a predictive rendering component module, according to some embodiments.

FIG. 7 illustrates an embodiment of a Predictive Rendering Component Module 700, which may implement each of the different embodiments of a predictive rendering component described herein.

For example, as described above in regard to FIG. 2A, a predictive rendering component may (1) access a predicted background color for a character of a font type, where the character corresponds to a bitmap that has been generated from a mask, and where the mask is based on the font type, as reflected in stage 202—and this access may be accomplished through the use of Graphics Module API (application programming interface) 706 to communication with a graphics module, (2) composite the predicted background color with a background color of the bitmap for the character, where the compositing of the background results in the creation of a composite background, as reflected in stage 204—and this compositing may be accomplished through the use of Compositing Module 708, (3) generate a rendering of the character, where the rendering is based on the composited background, based on a color of the character, and also based on the mask for the character, as reflected in stage 206—and this generation of renderings may be accomplished through the use of Rendering Module 710, (4) remove one or more elements of the composited background from the rendering of the character, as reflected in stage 208—and this removal may be accomplished through the use of Background Removal Module 714.

Further, in the embodiments described above in regard to FIGS. 5 and 6, where the predictive rendering component is specified to determine a match between a destination background and multiple predicted backgrounds, as reflected in, for example stage 608 of FIG. 6—this may be accomplished through the use of Background Matching Module 714.

Output 720 may be, for example, the smoothed bitmap of the character 210a in FIG. 2A, or the character rendering on a transparent background 406a in FIG. 4A. In other words, Output 720 may be used in creating a final rendering of an image to be displayed on a screen to a user.

Example Computer System

Figure 8:
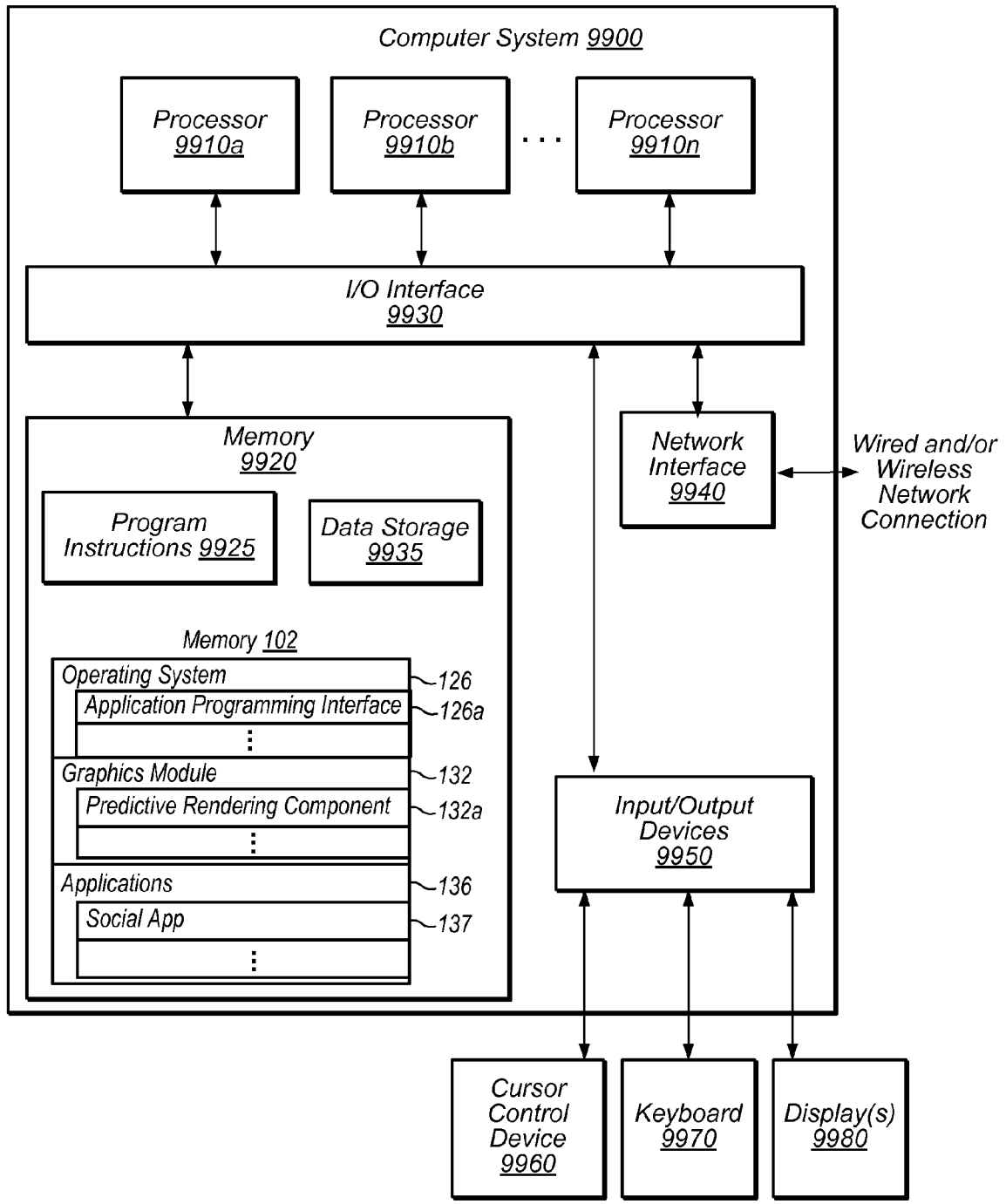
FIG. 8 depicts elements of an example computer system capable of implementing a predictive rendering component.

FIG. 8 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9360a-9360n coupled to system memory 9370 via input/output (I/O) interface 9380. The computer system further includes network interface 9390 coupled to I/O interface 9380, and one or more input/output devices 9382, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9370 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. A non-transitory, computer-readable storage medium may include storage media or memory media such as magnetic or optical media such as disks or DVD/CD-ROM, volatile or non-volatile media such as RAM, ROM, and flash drives. More generally, computer-accessible or computer-readable storage media may also include transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    performing, by one or more computing devices:
        accessing a predicted background color for a shape, wherein the shape corresponds to a bitmap generated from a mask of the shape;
        compositing the predicted background color with a background color of the bitmap for the shape to create a composited background;
        generating a rendering of the shape, wherein the rendering is based on the composited background, a color of the shape, and the mask;
        removing one or more elements of the composited background from the rendering of the shape; and creating a smoothed bitmap of the shape, wherein said creating comprises compositing, after said removing, the rendering of the shape with a destination background.

2. The method of claim 1, wherein said removing comprises determining a background removal factor based on the rendering of the shape, based on the composited background, and based on the mask.

3. The method of claim 1, wherein said removing comprises determining, based on a user setting, an amount of fringe to remove from the rendering of the shape.

4. The method of claim 1, wherein said accessing comprises communicating, through an application programming interface, with a graphics module, and wherein the graphics module determines and stores the predicted background color.

5. The method of claim 1, wherein the destination background is a composite of a plurality of bitmaps, and wherein at least one of the plurality of bitmaps is generated from a process different from the process performing said accessing, said compositing, said generating, said removing, and said creating.

6. The method of claim 1, wherein the destination background is the background for the bitmap for the shape.

7. The method of claim 6, further comprising updating the bitmap for the shape to be the smoothed bitmap of the shape.

8. A system, comprising:
a computing device comprising at least one processor; and
a memory comprising program instructions, wherein the memory is coupled to the at least one processor, and wherein the program instructions are executable by the at least one processor to:
access a predicted background color for a character of a font type, wherein the character corresponds to a bitmap generated from a mask based on the font type;
composite the predicted background color with a background color of the bitmap for the character to create a composited background;
generate a rendering of the character, wherein the rendering is based on the composited background, a color of the character, and the mask;
remove one or more elements of the composited background from the rendering of the character; and
create a smoothed bitmap of the character, wherein said creating comprises compositing, after said removing, the rendering of the character with a destination background.

9. The system of claim 8, wherein to remove the one or more elements of the composited background, the program instructions are further executable by the at least one processor to determine a background removal factor based on the rendering of the character, based on the composited background, and based on the mask.

10. The system of claim 8, wherein to remove the one or more elements of the composited background, the program instructions are further executable by the at least one processor to determine, based on a user setting, an amount of fringe to remove from the rendering of the character.

11. The system of claim 8, wherein to access the predicted background color for the character, the program instructions are further executable by the at least one processor to communicate, through an application programming interface, with a graphics module, and wherein the graphics module determines and stores the predicted background color.

12. The system of claim 8, wherein the destination background is a composite of a plurality of bitmaps, and wherein at least one of the plurality of bitmaps is generated from a process different from the process performing said accessing, said compositing, said generating, said removing, and said creating.

13. The system of claim 8, wherein the destination background is the background for the bitmap for the character.

14. The system of claim 13, wherein the program instructions are further executable by the at least one processor to update the bitmap for the character to be the smoothed bitmap of the character.

15. A non-transitory, computer-readable storage medium storing program instructions, wherein the program instructions are computer-executable to implement:
accessing a predicted background color for a character of a font type, wherein the character corresponds to a bitmap generated from a mask based on the font type;
compositing the predicted background color with a background color of the bitmap for the character to create a composited background;
generating a rendering of the character, wherein the rendering is based on the composited background, a color of the character, and the mask;
removing one or more elements of the composited background from the rendering of the character; and
creating a smoothed bitmap of the character, wherein said creating comprises compositing, after said removing, the rendering of the character with a destination background.

16. The non-transitory, computer-readable storage medium of claim 15, wherein said removing comprises determining a background removal factor based on the rendering of the character, based on the composited background, and based on the mask.

17. The non-transitory, computer-readable storage medium of claim 15, wherein said removing comprises determining, based on a user setting, an amount of fringe to remove from the rendering of the character.

18. The non-transitory, computer-readable storage medium of claim 15, wherein said accessing comprises communicating, through an application programming interface, with a graphics module, and wherein the graphics module determines and stores the predicted background color.

19. The non-transitory, computer-readable storage medium of claim 15, wherein the destination background is a composite of a plurality of bitmaps, and wherein at least one of the plurality of bitmaps is generated from a process different from the process performing said accessing, said compositing, said generating, said removing, and said creating.

20. The non-transitory, computer-readable storage medium of claim 15, wherein the destination background is the background for the bitmap for the character.

* * * * *